(12) United States Patent
Albrecht et al.

(10) Patent No.: US 12,466,102 B2
(45) Date of Patent: Nov. 11, 2025

(54) DEVICE AND METHOD FOR COATING A WORKPIECE

(71) Applicant: HOMAG GmbH, Schopfloch (DE)

(72) Inventors: Ludwig Albrecht, Dornstetten-Aach (DE); Ruven Weiss, Alpirsbach (DE); Harald Rieger, Waldachtal (DE); Felix Schatz, Dornhan (DE)

(73) Assignee: HOMAG GmbH, Schopfloch (DE)

( * ) Notice: Subject to any disclaimer, the term of this patent is extended or adjusted under 35 U.S.C. 154(b) by 136 days.

(21) Appl. No.: 17/784,625

(22) PCT Filed: Dec. 9, 2020

(86) PCT No.: PCT/EP2020/085301
§ 371 (c)(1),
(2) Date: Jun. 10, 2022

(87) PCT Pub. No.: WO2021/116179
PCT Pub. Date: Jun. 17, 2021

(65) Prior Publication Data
US 2023/0007828 A1 Jan. 12, 2023

(30) Foreign Application Priority Data
Dec. 11, 2019 (DE) .................... 10 2019 133 934.0

(51) Int. Cl.
*B27D 5/00* (2006.01)
(52) U.S. Cl.
CPC ................... *B27D 5/003* (2013.01)

(58) Field of Classification Search
CPC .................................. B27D 5/003; B27N 3/08
See application file for complete search history.

(56) References Cited

U.S. PATENT DOCUMENTS

| | | |
|---|---|---|
| 2012/0058279 A1 | 3/2012 | Schmid |
| 2012/0285604 A1* | 11/2012 | Schmid .................. B27D 5/003 156/60 |

FOREIGN PATENT DOCUMENTS

| | | |
|---|---|---|
| DE | 20203827 U1 | 7/2002 |
| DE | 102016209107 A1 | 11/2017 |
| DE | 102017122701 A1 | 4/2019 |

(Continued)

OTHER PUBLICATIONS

International Search Report for International Application No. PCT/EP2020/085301, mailed Mar. 9, 2021, 7 pages Including translation.

(Continued)

*Primary Examiner* — George R Koch
(74) *Attorney, Agent, or Firm* — Morgan, Lewis & Bockius LLP

(57) ABSTRACT

An apparatus for coating a workpiece that consists at least in sections of wood, wood-based material, synthetic material or the like. The apparatus can include a pressing device for pressing a coating material onto a surface of the workpiece to be coated, a conveying device for inducing a relative movement between the workpiece and the pressing device, an activation device for activating a joining agent used for joining the coating material to the surface of the workpiece to be coated, and a sensor for detecting an operating variable of the joining agent. The apparatus can include a shielding device for shielding a sensor section of the sensor.

12 Claims, 3 Drawing Sheets

(56) References Cited

FOREIGN PATENT DOCUMENTS

| EP | 2799793 A1 | 11/2014 |
| EP | 2902161 A1 | 8/2015 |
| EP | 3318377 A1 | 5/2018 |
| EP | 3611001 A1 | 2/2020 |

OTHER PUBLICATIONS

International Preliminary Report on Patentability of International Application No. PCT/EP2020/085301 mailed Jun. 23, 2022, 8 pages.
Second Office Action and Search Report for Chinese Application No. 202080085036.8, issued Aug. 9, 2023, 11 pages including translation.
Office Action for European Application No. 20824193.5 dated Nov. 28, 2024, 6 pages.

\* cited by examiner

DEVICE AND METHOD FOR COATING A WORKPIECE

This application is a 371 of PCT/EP2020/085301, filing date Dec. 9, 2020.

TECHNICAL FIELD

The invention relates to an apparatus and a method for coating a workpiece which preferably consists at least in sections of wood, wood-based materials, synthetic material or the like.

PRIOR ART

In the furniture and components industry, for example, workpieces are often provided with a coating material on one of their surfaces, for instance an edge. The coating material is usually attached by means of a suitable joining agent or adhesive applied to the workpiece or coating material in the form of a hot-melt adhesive, for example.

Alternatively, it is also common to already provide the joining agent or adhesive on the coating material or workpiece in advance, or also to form the joining agent or adhesive integrally therewith. In this case, the joining agent is activated or kept activated during the coating process by means of a suitable apparatus, usually heated by means of a suitable energy source. Laser units and hot air units have become particularly prevalent as energy sources, although numerous other technologies such as microwave, infrared, plasma, ultrasound or the like are also possible.

One of the crucial factors for the quality of the coating result is that the joining agent is heated to the appropriate temperature or temperature window. Against this background, DE 10 2017 122 701 A discloses a coating apparatus in which the temperature of the joining agent is monitored by a temperature sensor. However, practice has shown that the measurement results of the temperature sensor are prone to variations, with the result that the desired optimization of the temperature of the joining agent cannot be achieved with sufficient reliability.

Description of the Invention

Thus, the object of the present invention is to provide an apparatus and a method of the type specified above, which enable a high-quality coating result with enhanced reliability even over longer periods of time.

According to the invention, this object is solved by some embodiments of the apparatus disclosed herein. Particularly preferred further developments of the invention are specified in the dependent claims.

The invention is based on the finding that in a coating apparatus of the same type, variations in the measurement result of a sensor, such as a temperature sensor, are mainly caused by contamination of the same. According to the invention, it is thus provided that the coating apparatus comprises a shielding device for shielding a sensor section of the sensor.

In this manner, a sharp increase in the measurement accuracy of the sensor can be achieved by a relatively simple measure, and this measurement accuracy can also be maintained with minor variations over long periods of time. This means that operating parameters of the joining agent that are important for the quality of the coating process can be very precisely controlled, which leads to a permanently high-quality coating result. Within the scope of the invention, the temperature of the joining agent has proven to be a particularly important operating parameter. However, alternatively or additionally, other operating parameters can also be detected by the at least one sensor, such as the porosity of the workpiece, the viscosity of the joining agent, the layer thickness of the joining agent or the like.

In particular, through use of the invention, particularly high-quality so-called "zero joints" can be created, in which the joint between the coating material and the workpiece is practically no longer visible. In addition, such a high-quality configured zero joint also has technical advantages such as high impermeability to moisture and high strength of the joint.

Within the scope of the present invention, the shielding device can be configured in many ways. However, according to a further development of the invention provision is made that the shielding device comprises a barrier fluid outlet to dispense barrier fluid for shielding the sensor section. This is a particularly simple way of achieving the desired shielding effect, and it also results in a simple construction of the apparatus since a fluid supply (such as a compressed air supply) is usually present in machines of the type in question here anyway.

Particular synergies arise if, according to a further development of the invention, the activation device comprises an outlet assembly for dispensing a preferably heated fluid, in particular gas, for activating the joining agent. In these cases, the outlet assembly in the joining area already constitutes a suitable source of fluid which, with minimal technical effort, can provide an additional function to provide a barrier fluid for shielding the sensor section.

Although, within the scope of the invention, the shielding device can also be provided independently of the activation device, it is preferred according to a further development of the invention that the shielding device is at least partially integrated into the activation device. Thus, the shielding device cannot only be provided with minimal construction effort but also in a particularly compact design. It should be noted in this respect that the sensor must detect the operating variable of the joining agent in a narrow joint gap between coating material and workpiece, and therefore a compact design is of particular importance for the technical implementation and construction of the apparatus.

It is thereby particularly preferred that the activation device, particularly outlet assembly, comprises at least one barrier fluid outlet to dispense barrier fluid for shielding the sensor section. In this variant, it becomes particularly clear that within the scope of the present invention, the provision of a barrier fluid outlet is possible with minimal effort and without significant modification to the overall structure. In extreme cases, according to a further development of the invention, a fluid outlet (which is present anyway) of the outlet assembly can be used as a barrier fluid outlet, and therefore—apart from a suitable connection or integration of the sensor to or into the nozzle assembly—a constructional change of the coating apparatus is not required at all. Nevertheless, according to the invention, the above-mentioned significant advantages over the prior art can be achieved.

Alternatively or additionally, however, it is also possible within the scope of the present invention that at least one barrier fluid outlet is provided independently of the fluid outlets of the outlet assembly. Depending on the construction of the outlet assembly, this allows achieving an easier connection of the sensor, which in particular can also make it easier to retrofit existing coating apparatus.

According to a further development of the invention, the shielding device comprises a suction device having at least one suction opening for generating a barrier fluid flow. Thus, the desired barrier fluid effect cannot only be achieved by injection but also by suction, with both concepts also being able to be combined.

According to a further development of the invention, provision is made that the sensor is configured to send and/or receive a sensor signal for detecting the operating variable of the joining agent, which preferably passes through at least one barrier fluid outlet and/or the at least one suction opening. By integrating the path of the sensor signal into the structure of the barrier fluid outlet, a spatial separation can be created between the contaminated outside (downstream of the barrier fluid outlet) and the protected inside (upstream of the barrier fluid outlet), which results in a particularly effective shielding with a simple construction.

It is particularly preferred that the apparatus comprises at least one deflection device for deflecting at least one sensor signal. As a result hereof, a particularly compact design, especially in the area of the so-called joint gap is made possible since usually horizontal probing is required in the joint gap, while the installation space in the horizontal direction is extremely limited. The deflection device allows the sensor signal to follow the existing geometry in the area of the joint gap and pass horizontally or inclined, for example, and then be deflected in the vertical direction, for example, such that the sensor can be provided outside the joint gap, resulting in an overall narrow design. The additional advantage arising therefrom is that the sensor as such can be arranged at a certain distance from the usually very strongly heated joint gap, and therefore an even more precise detection of the relevant operating variable can be achieved.

It is thereby particularly advantageous if a deflection device is integrated into the activation device. Just like some of the above measures, this contributes to a compact design and a simple construction. However, the deflection device can advantageously also be provided completely or partially independent of the activation device.

Within the scope of the invention, the deflection device can be configured in many ways. According to a further development of the invention, provision is made that a deflection device comprises a reflective element such as, in particular, a mirror which preferably comprises a polished metal surface and may optionally be partially transparent. However, other reflective elements such as a prism, a crystal with a fracture surface, etc. can also be used. Again, such a reflective element combines the advantages of a simple construction, a low space requirement and also a high reliability. However, alternatively or additionally, it is also possible within the scope of the present invention that at least one deflection device comprises a signal guiding element such as, in particular, an optical fiber. In this manner, for example, the amount of adjustment effort can be reduced and the risk of contamination or misalignment of other types of deflection devices be minimized.

To achieve precise and reliable measurement results in continuous operation, it is provided according to a further development of the invention that the sensor has a pyrometer and/or a bolometer and/or a semiconductor sensor.

Moreover, according to a further development of the invention provision is made such that a test sensor, in particular a temperature test sensor, is provided which is preferably arranged independently of the (temperature) sensor in an area, the operating variable of which can be detected by the sensor. This enables a particularly simple control and, optionally, also calibration of the sensor according to the invention.

The above advantages can be achieved in a particularly pronounced manner when carrying out some embodiments of the method disclosed herein.

DETAILED DESCRIPTION OF PREFERRED EMBODIMENTS

Preferred embodiments of the invention will be described in detail below with reference to the accompanying drawings.

Figure 1:
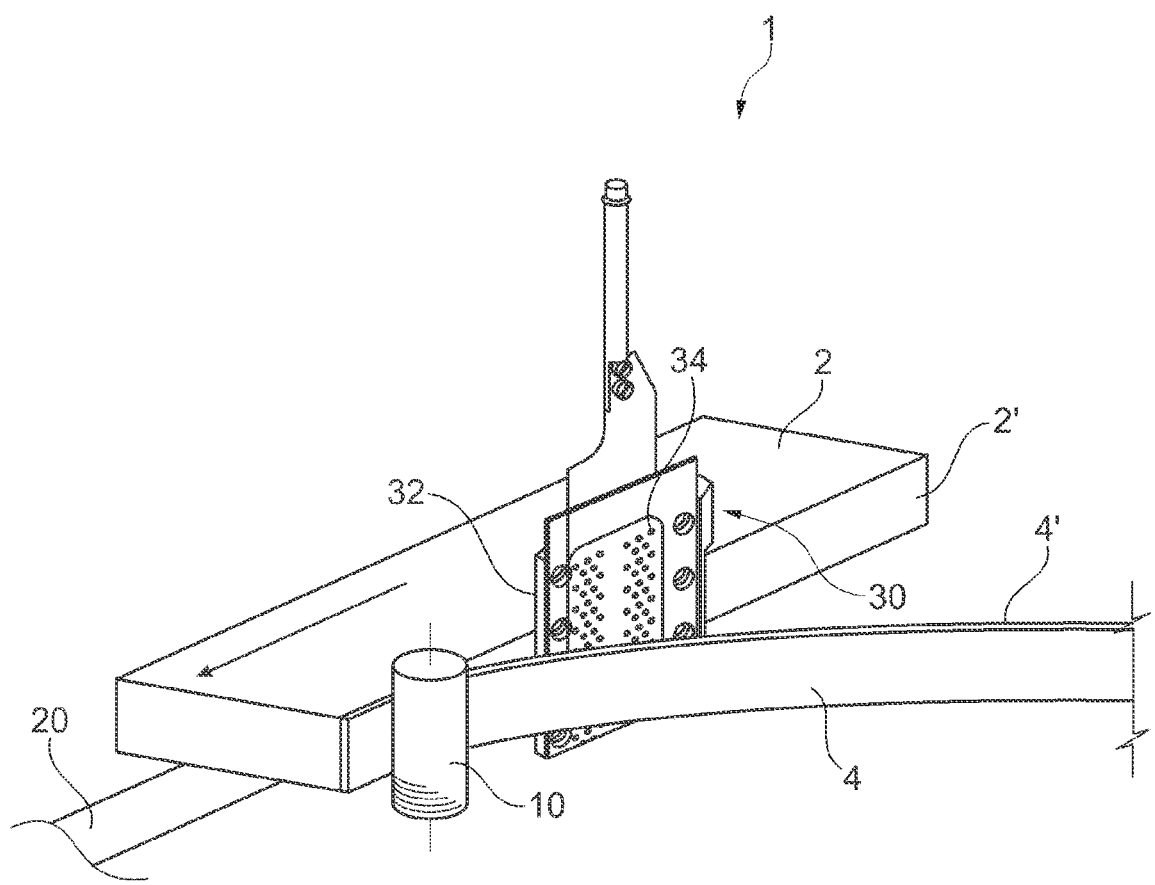
FIG. 1 schematically shows a partial perspective view of one embodiment of the apparatus according to the invention.

An apparatus 1 for coating a workpiece 2 is schematically shown in a partial perspective view in FIG. 1. The apparatus 1 is used for coating workpieces which preferably consist at least in sections of wood, wood-based materials, synthetic material or the like which are widely used in the furniture and components industry. The coating material 2 can, for example, be a narrow surface coating (edge) made of a wide variety of materials, such as synthetic material, veneer, paper or even metal. However, alternatively or additionally, a wide surface or any other surface of a workpiece 2 can be provided with a coating material 4.

Although the present invention is not restricted hereto, the coating material 4 comprises in the present embodiment a joining agent 4' provided on the side of the coating material 4 facing the workpiece 2. The joining agent 4' can, for example, be an adhesive that is activatable by heat, such as a hot-melt adhesive. Alternatively, it is also conceivable that the coating material 4 comprises an integral layer 4' that develops adhesive properties through activation, such as various meltable synthetic materials. The entire coating material 4 can also consist of a corresponding material such that there is not a discrete joining agent layer 4'.

The coating apparatus 1 firstly comprises a pressing device 10 which in the present embodiment has a pressure roller and is used to press the coating material 4 onto a surface 2' of the workpiece 2 to be coated.

Moreover, the coating apparatus 1 comprises a conveying device 20 which in the present embodiment is configured as a conveying device, for example in the form of a conveyor belt, carrier belt, conveyor chain or the like. However, it should be noted that instead of a continuous conveying device for conveying the workpiece 2, a so-called stationary concept can also be used, in which the workpiece 2 is essentially stationary during the coating process, and the pressing device 10 is moved along the workpiece and optionally also around the workpiece. Hybrid forms of both concepts are also possible within the scope of the invention, with the conveying device 20 always being used to induce a relative movement between the workpiece 2 and the pressing device 10.

Figure 2:
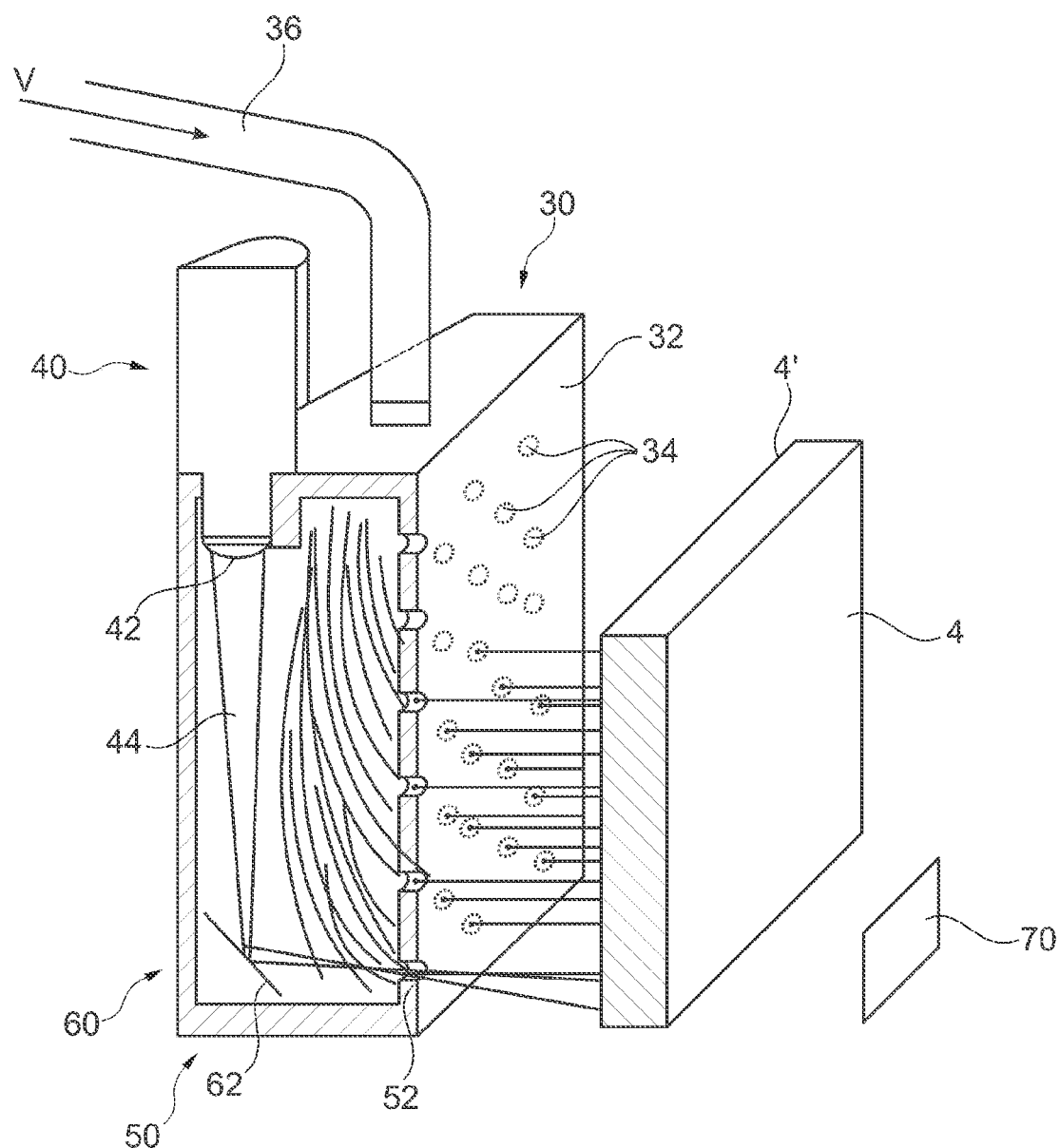
FIG. 2 schematically shows a partial sectional view of the apparatus shown in FIG. 1.

The coating apparatus 1 further comprises an activation device 30 which in the present embodiment comprises a nozzle arrangement 32 for dispensing a heated fluid used to activate the joining agent 4'. As best seen in FIG. 2, the heated fluid is supplied as a volume flow V to the nozzle assembly 32 via a supply line 36, with a fluid supply and heating device being provided upstream. The fluid supply can advantageously also be a pressurized fluid supply which supplies the fluid to the nozzle assembly 32 at an overpressure of, purely as an example, at least 1.5 bar.

In the simplest case, the heated (pressurized) fluid can be hot air. However, it is equally possible for the fluid to contain other gases and possibly also liquids or liquid droplets. Furthermore, it should be noted that instead of a nozzle assembly, a different type of outlet assembly can also be used, in which the fluid, for example, is dispensed to the outside through a fabric.

Figure 3:
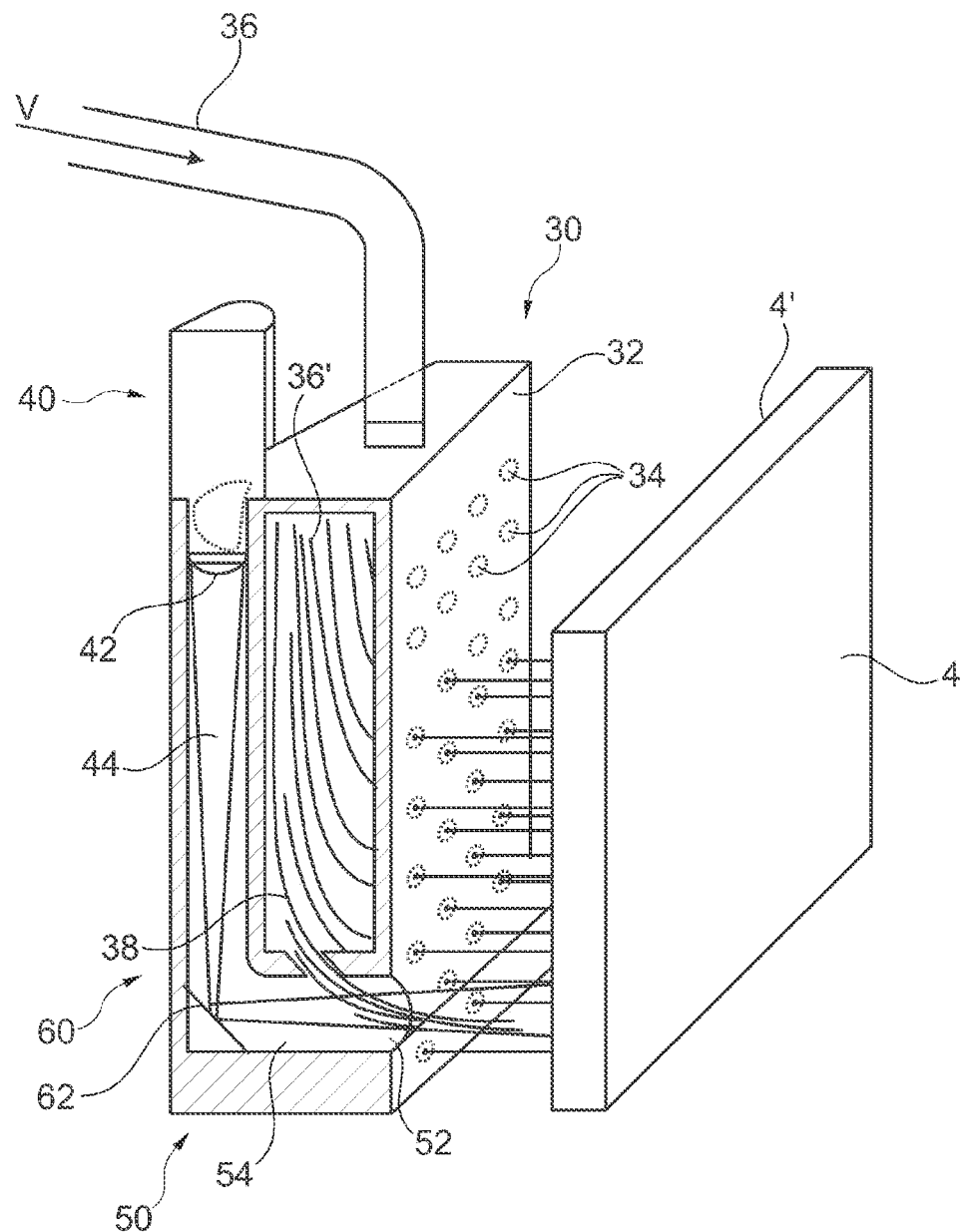
FIG. 3 schematically shows a partial sectional view of a further embodiment.

Further details of the coating apparatus 1 are schematically shown in sectional views in FIGS. 2 and 3 which each show a different embodiment. As can be seen in FIG. 2, the coating apparatus 1 in the present embodiment comprises a temperature sensor 40 for detecting a temperature of the joining agent 4', which can be configured, for example, as a pyrometer or a bolometer or a semiconductor sensor. The temperature sensor 40 emits a sensor signal such as a sensor beam 44 which in the present embodiment is directed to the joining agent 4' via a deflection mirror 62. The corresponding reflection is detected and evaluated by a sensor section 42 of the temperature sensor 40 so as to conclude the temperature of the joining agent 4'.

Alternatively or in addition to the temperature sensor, other sensors can also be used within the scope of the invention for detecting an operating variable, for example for detecting the porosity of the workpiece, the viscosity of the joining agent, the layer thickness of the joining agent or the like.

In the present embodiment, the deflection mirror 62 is a polished sheet of metal, such as V2A in particular, although other reflection elements can also be used which may also be partially transparent. Alternatively, it is also possible to pass the sensor beam 44 through a suitable signal guiding element, such as an optical fiber, to the joining agent 4' to be scanned.

Moreover, the coating apparatus 1 comprises a shielding device 50 used to shield the sensor section 42 of the temperature sensor 40 from external influences such as in particular contamination. For this purpose, the housing of the nozzle assembly 32 acts as a shield against the environment. However, the shielding device 50 of the present embodiment moreover also comprises a barrier fluid outlet 52 used to dispense barrier fluid for shielding the sensor section 42. In the present embodiment, the temperature sensor 40 is substantially integrated into the nozzle assembly 32 such that a fluid outlet 34 of the nozzle assembly 32, which may also be used to dispense heated fluid to the joining agent 4', serves as a barrier fluid outlet 52. This is achieved in that in the present embodiment, the sensor signal 44, which is used to detect the temperature of the joining agent 4', extends through the barrier fluid outlet 52. Since heated fluid flows through this barrier fluid outlet 52 at least during operation of the coating apparatus 1, the temperature sensor 40 and in particular the sensor section 42 are effectively protected from environmental influences, contamination, etc., while precise detection of the temperature of the joining agent layer 4' is made possible at the same time.

Furthermore, in the present embodiment, the coating apparatus 1 comprises a test sensor 70 which may be configured, for example, as a temperature test sensor such as a temperature resistor. The temperature test sensor 70 can, for example, be arranged on a machine part of the coating apparatus 1 in an area, the temperature of which can, in principle, be detected by the temperature sensor 40, for example when no coating material 4 is currently inserted into the coating apparatus 1. In this state—without inserted coating material 4—a checking or calibration process can then be carried out, during which the temperature of the relevant machine area is measured and compared with each other by means of both the temperature test sensor 70 and the temperature sensor 40. This allows to further increase the reliability and precision of the temperature measurement according to the invention.

The operation of the coating apparatus 1 according to the invention is carried out for example as follows. While a workpiece 2 to be coated is conveyed by means of the conveying device 20 in the throughput direction indicated by an arrow in FIG. 1, the joining agent layer 4' of the coating material 4 also supplied is activated by hot pressurized fluid by using the activation device 30. Simultaneously, the actual temperature reached by the joining agent 4' is detected using the temperature sensor 40 and then compared with a target temperature or a target temperature range of the joining agent 4'. If the detected temperature deviates from the temperature of the joining agent 4' or is outside the target range, different operating parameters can be adjusted to bring the detected temperature closer to the target temperature. In addition to adjusting the temperature, pressure, or volume flow rate of the fluid dispensed by the activation device 30, the throughput speed can, for example, also be changed since this also varies the energy input.

Although an activation device in the form of a fluid nozzle assembly has been described in the above disclosed embodiments, other activation devices may also be used within the scope of the invention, such as laser, microwave, ultrasonic, infrared, plasma, or the like. A temperature sensor shielded by a shielding device can also be used advantageously in these activation devices in order to advantageously and, above all, also reliably and permanently optimize the joining process.

The embodiment of the invention shown in FIG. 3 largely corresponds to the embodiment described above and shown in FIG. 2, and therefore only the differences between the two embodiments will be discussed below. For example, in the embodiment shown in FIG. 3, the nozzle assembly 32 is provided with a separate, substantially L-shaped channel 54 for accommodating the temperature sensor 40 and the deflection device 60. Moreover, the embodiment shown in FIG. 3 includes a barrier fluid outlet 52 provided independently of the fluid outlets 34 of the nozzle assembly 10.

In addition to the L-shaped channel 54, the nozzle assembly 32 has a fluid chamber 36' that is supplied with pressurized fluid via the supply line 36 and distributes it to the fluid outlets 34. This fluid chamber 36' communicates with the L-shaped chamber 54 via a passage 38 such that a barrier fluid flow occurs in the L-shaped chamber 54, which exits the L-shaped chamber 54 via the barrier fluid outlet 52. The temperature sensor 40 detects the temperature of the joining agent 4' through this barrier fluid outlet 52, by means of which it is once again effectively and permanently protected from external influences such as, in particular, contamination.

The invention claimed is:

1. An apparatus for coating a workpiece comprising wood, wood-based materials, or synthetic material, the apparatus comprising:
    a pressing device for pressing a coating material onto a surface of the workpiece to be coated;
    a conveying device for inducing a relative movement between the workpiece and the pressing device;
    an activation device for activating a joining agent used for joining the coating material to the surface of the workpiece to be coated;

a temperature sensor for detecting a temperature of the joining agent, the temperature sensor being configured to send or receive a sensor signal for detecting the temperature; and a shielding device for shielding a sensor section of the temperature sensor, the shielding device being at least partially integrated into the activation device;

wherein:

(i) the activation device comprises a barrier fluid outlet to dispense barrier fluid for shielding the sensor section, and (ii) the apparatus further comprises a deflection device for deflecting the sensor signal, further wherein (a) the deflection device comprises a reflective element and/or (b) the deflection device comprises a signal guiding element.

2. An apparatus according to claim 1, characterized in that the barrier fluid outlet is configured to to dispense barrier fluid for shielding the sensor section.

3. An apparatus according to claim 1, characterized in that the activation device comprises an outlet assembly for dispensing an activating fluid for activating the joining agent.

4. An apparatus according to claim 1, characterized in that the activation device comprises an outlet assembly having at least one fluid outlet that serves as the barrier fluid outlet.

5. An apparatus according to claim 4, characterized in that the barrier fluid outlet is provided independently of fluid outlets of the outlet assembly.

6. An apparatus according to claim 1, characterized in that the shielding device comprises a suction device having at least one suction opening for generating a barrier fluid flow.

7. An apparatus according to claim 1, characterized in that the temperature sensor is configured to detect the temperature of the joining agent passing through the barrier fluid outlet or at least one suction opening of the shielding device.

8. An apparatus according to claim 1, characterized in that the deflection device is integrated into the activation device.

9. An apparatus according to claim 1, characterized in that the signal guiding element comprises an optical waveguide.

10. An apparatus according to claim 1, characterized in that the temperature sensor comprises a pyrometer or a bolometer or a semiconductor sensor.

11. An apparatus according to claim 1, further comprising a temperature test sensor arranged independently of the temperature sensor in an area, the temperature of which can be detected by the temperature sensor.

12. A method for coating a workpiece comprising wood, wood-based materials, or synthetic material, using an apparatus, said apparatus comprising:

a pressing device for pressing a coating material onto a surface of the workpiece to be coated;

a conveying device for inducing a relative movement between the workpiece and the pressing device;

an activation device for activating a joining agent used for joining the coating material to the surface of the workpiece to be coated;

a temperature sensor for detecting a temperature of the joining agent, the temperature sensor being configured to send or receive a sensor signal for detecting the temperature; and a shielding device for shielding a sensor section of the temperature sensor, the shielding device being at least partially integrated into the activation device;

wherein:

(i) the activation device comprises a barrier fluid outlet to dispense barrier fluid for shielding the sensor section, and (ii) the apparatus further comprises a deflection device for deflecting the sensor signal, further wherein (a) the deflection device comprises a reflective element and/or (b) the deflection device comprises a signal guiding element; and said method comprising the steps of:

activating the joining agent used for joining the coating material onto the surface of the workpiece to be coated by means of the activation device;

detecting the temperature of the joining agent using the temperature sensor;

comparing the detected operating variable with a target operating variable of the joining agent; and adjusting at least one operating parameter by means of the activation device, in order to bring the detected operating variable closer to the target operating variable.

* * * * *